Dec. 20, 1966 H. JAKOBSON 3,292,487
MICROFILM CAMERA ARRANGEMENTS

Filed July 9, 1964 5 Sheets-Sheet 3

Inventor:
Hans Jakobson
By Beaman & Beaman
attys

United States Patent Office 3,292,487
Patented Dec. 20, 1966

3,292,487
MICROFILM CAMERA ARRANGEMENTS
Hans Jakobson, Quickborn, Holstein, Germany, assignor to Lumoprint Zindler K.G., a corporation of Germany
Filed July 9, 1964, Ser. No. 381,311
Claims priority, application Germany, July 17, 1963, L 45,370
14 Claims. (Cl. 88—24)

The present invention relates to a microfilm camera arrangement comprising a desk-shaped pattern table and a column for the camera on which the camera is adjustable in height by means of a support arm or bracket in such a manner that the front edge of the table forms a permanent lay edge for the master pattern.

These arrangements have a horizontal pattern table. They are equipped with comparatively complex guides for the camera or for its supporting arm on the column if the front edge of the table is to serve as a permanent lay edge. In this connection it must be taken into consideration that, in accordance with its increasing distance from the pattern table, the camera must be moved with such increasing distance further towards the rear so that the flank of the picture angle associated with the front edge of the pattern table remains always on the lay edge for the pattern.

For this reason, known columns are equipped with slanting guides for the supporting arm or bracket. Such known columns may have the form of a frame, and may comprise, for example, two slanting guide rails in these frames. These frame-like columns are detachable and may be assembled at the point of use. However, the numerous joints cause a certain amount of play which makes the accurate slanting arrangement of the guide rails very difficult, or requires considerable additional expenditure in order to achieve a perfect alignment.

Even the slanting assembly of a compact camera column presents certain problems, because a sloping column is more difficult to erect than a vertical column.

In addition, there are also known arrangements comprising vertical camera columns. However, these arrangements abandon the advantage of a front lay edge for the pattern.

The known horizontal pattern tables are unsuitable, particularly for processing large size patterns, because, in order to reach the rear edge of the pattern, for example, in order to smooth the same, the operator has to bend over the whole table.

With microfilm camera arrangements of this kind it is also known to press the pattern on to the table by pneumatic means; in this construction, the table forms a pressure chamber which may be evacuated, while the edge of a pattern lay plate on the table is equipped with slots, whereby this vacuum may be externally effective. In this arrangement, a transparent foil is placed over the pattern and this foil extends to cover the suction slots at the edge of the lay plate and is retained by the vacuum. Handling of this pattern which is pushed on is comparatively complicated in view of the large surface of the material. It is also known to roll the foil from one side over the pattern.

It is an object of the present invention to provide a microfilm camera arrangement whereby the disadvantages inherent in known arrangements are avoided and which, moreover, combines a more simple construction with easier operation and better utilization of the whole arrangement.

It is a further object of the invention to improve the fixing of the patterns on the pattern lay tables of microfilm camera arrangements.

According to the present invention, the lay surface of the pattern table is inclined relative to the horizontal, and the camera is arranged at the same angle. This inclination, and more particularly such inclination towards the front bottom, facilitates the operation considerably, because the table can be more easily supervised and inspected and is more easily accessible, while the rearward parts of the table are more easily reached. An essential feature of the invention is in the combination of the sloping arrangement of the table and of the camera with a vertical camera column with vertical camera guide. The angles of inclination of the table and of the camera are equal and it is merely essential that, with rectilinear displacement of the camera, one flank of the picture angle remains within the region of the front edge lay for the pattern.

These features make it possible to construct the arrangement according to the invention in a much more simple manner, while avoiding stays for the column which may be much more easily aligned in the vertical position; more particularly, the camera column may be made as a compact box-profile structure. It should be stressed in this connection that it is much easier to place a table top at a certain angle than a column, especially since the table top can be supported in an adjustable manner at various points. The predetermined angle of inclination of the camera may be more easily obtained during the manufacture of the carrying arm.

A substantial advantage of the downward inclination of the table results in connection with the pneumatic suction device associated with the foil. According to the invention, the transparent contact foil is a roll which may move under the action of the inclination of the table automatically towards the lay edge and may be removed by means of a drive arrangement.

In a preferred embodiment of the invention, the foil is wound on a spindle, the ends of which are driven from a motor by means of a pulley drive and the foil being fixed with one edge on the upper part of the table can roll over the lay plate and the pattern mounted thereon to the front end of the pattern lay table. This handling of the foil by means of a spindle prevents lateral displacements between the pattern and the foil and thus also the acquisition of electrostatic charges and damage to the foil by scratching; the automatic operation also eliminates dirtying the foil by fingerprints and the like.

Another essential feature of the invention is the selective control of the roller arrangement in accordance with the size of the section of the lay plate used at the time, that is to say, with smaller sizes, the foil may be lowered from the lower half of the table. This arrangement saves working time. The travel of the foil may be selected by a selector switch. In another preferred embodiment of the invention, this travel is determined automatically by the height adjustment of the camera since this height adjustment is determined, in its turn, by the size of the pattern to be exposed.

The invention will be further described, by way of non-limitative example, with referecne to the accompanying drawings, showing in diagrammatic form a preferred embodiment of the invention. In the drawing.

In all drawings equivalent parts are designated by the same reference numerals.

Figure 1:
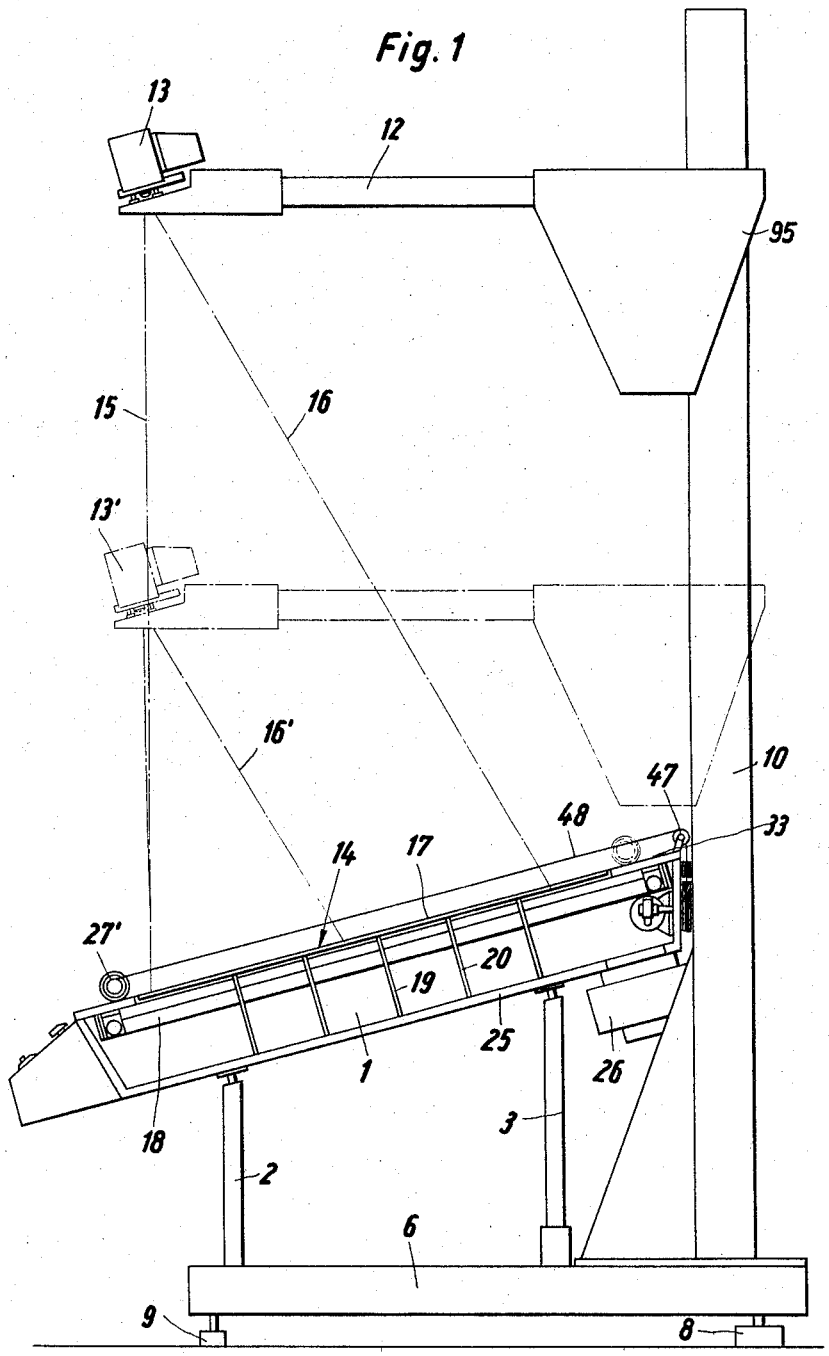
FIG. 1 is a side elevation of the microfilm camera arrangement, in which the side wall of the lay table facing the observer has been detached.
Figure 2:
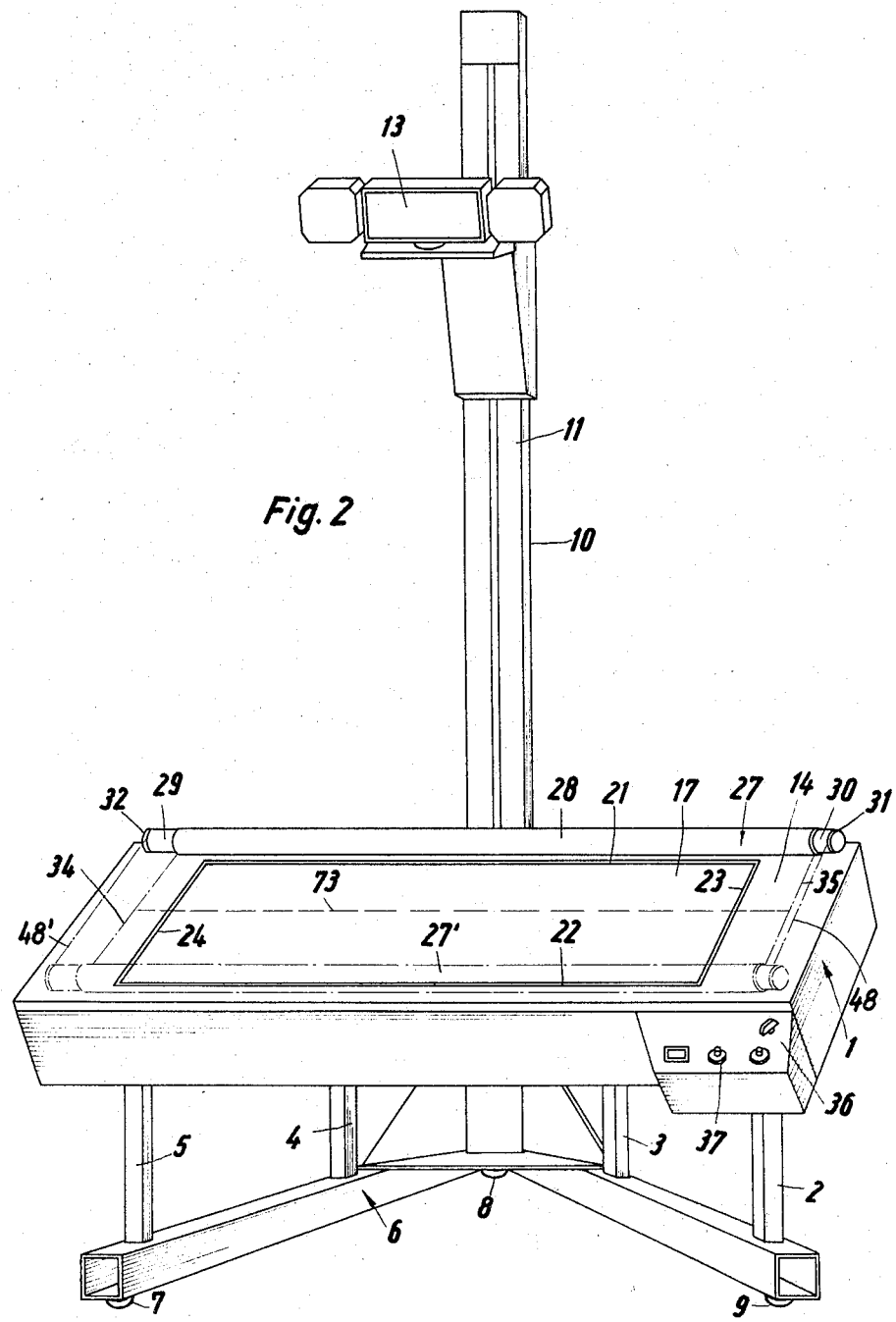
FIG. 2 is a perspective view of the arrangement from the top.

As shown in FIGS. 1 and 2, a desk-shaped pattern lay table 1 is supported by adjustable stays 2, 3, 4, 5 on a base 6, having the form of an angle and equipped in turn with three adjustable legs 7, 8, 9. This angled base 6 carries a column 10, having a guide 11 for a carrying arm or bracket 12 adapted to support a camera 13. Guide angles are mounted in a housing 95. As may be seen, the top 14 of the table is inclined towards the front, and the camera 13 is mounted at the same angle, that is to say, the objective lens of the camera is parallel to the surface 14 of the table. The dash-dot lines 15, 16 indicate the front and rear flanks of the picture angle, respectively, for the topmost camera position. As indicated in the drawing, the flank 15 is substantially vertical, and the camera may be moved into the position shown at 13', wherein the front flank 15 of the picture angle remains substantially in the same range while the rear flank 16' of the picture angle is shifted in the direction of the front edge of the table. The flank 15 is associated with a front lay edge for the pattern so that the patterns are always arranged with one edge in the same position, although the camera may be moved vertically.

The pattern table 1 has a lay plate 17 which may be transparent if bottom illumination is used, or opaque if the work is carried out with lamps adjacent to the arrangement. The type of illumination is irrelevant from the viewpoint of the invention and it is mentioned merely for the sake of completeness that lamps, such as 18, may be arranged in the desk-shaped lay table.

It may also be seen that the lay plate 17 is supported in its centre position by points such as 19, 20, and may be held at its edge by locating means, not shown, for example, by angles, spacers, and the like, so that slots 21, 22, 23, 24 are formed between the plate and the surrounding part of the table top 14. Thus, there are slot-shaped orifices 21–24 between the edges of the lay plate fitted into an opening in the table top 14 and the edges of this opening, communicating with the interior of the desk. A fan motor 26 is located on the underside 25 of the lay table whereby the closed interior space of this lay table may be evacuated.

The vacuum acts through the slots 21–24. A roller is guided on the lay table. This roller comprises a spindle, such as a plastic tube, having ends 29, 30 and a foil 28 wound thereon. The ends 29, 30 protrude on either side from the foil. These ends are provided with circumferential grooves 31, 32 with sufficiently long sections of cables 48 (FIG. 1) or 48, 48' (FIG. 2) to enable the foil roller to be reeled up and unreeled across the pattern table. An outer edge of the foil is fixed to the upper end of the table at 33, such as by gluing. The direction of winding of the foil is such that during the rolling down from the position shown in full lines in FIG. 2 into the dash-dot position 27' (see also FIG. 1 bottom left), the foil is positioned flush over the top 15 of the pattern table and over the lay plate 17. FIG. 2 shows that the lateral edges 34, 35 of the foil extend to cover the edge slots 23, 24.

This lowering of the roller into the position 27' applies the foil without friction to a pattern located on the lay plate.

Figure 3:
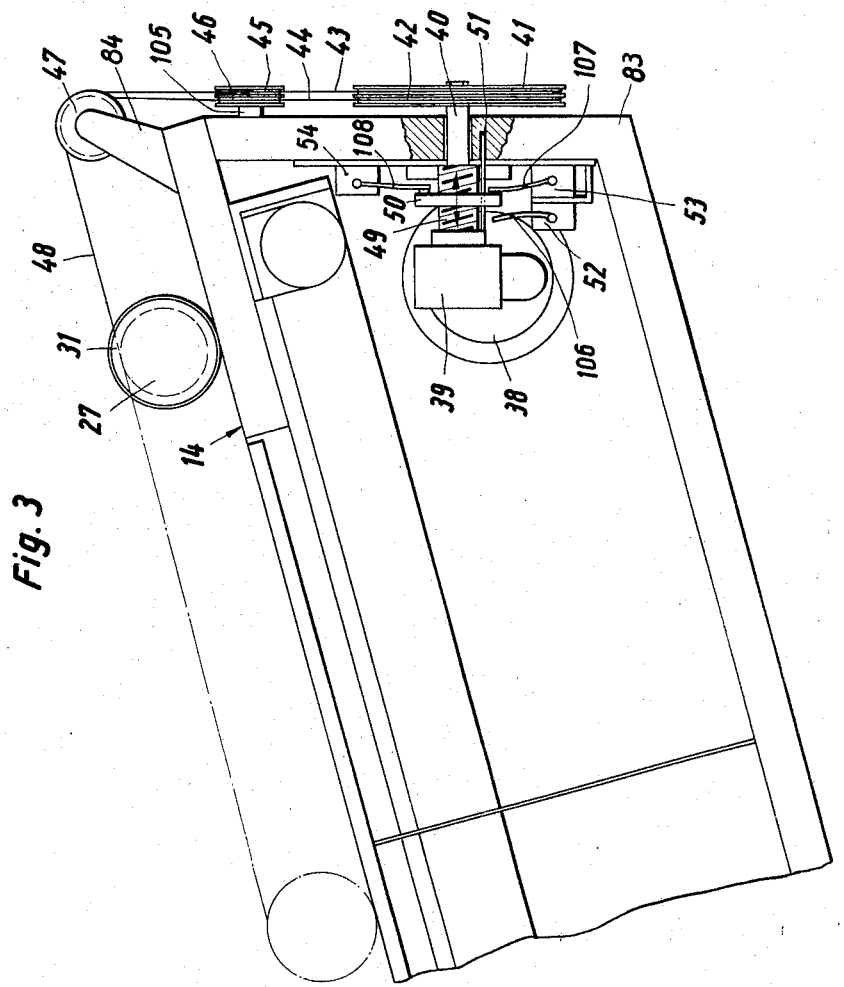
FIG. 3 shows on an enlarged scale the rear part of the table, corresponding to the view in FIG. 1, and explaining the camera drive, the front wall being detached and the rear wall of the table being shown in partially sectionalized form.
Figure 4:
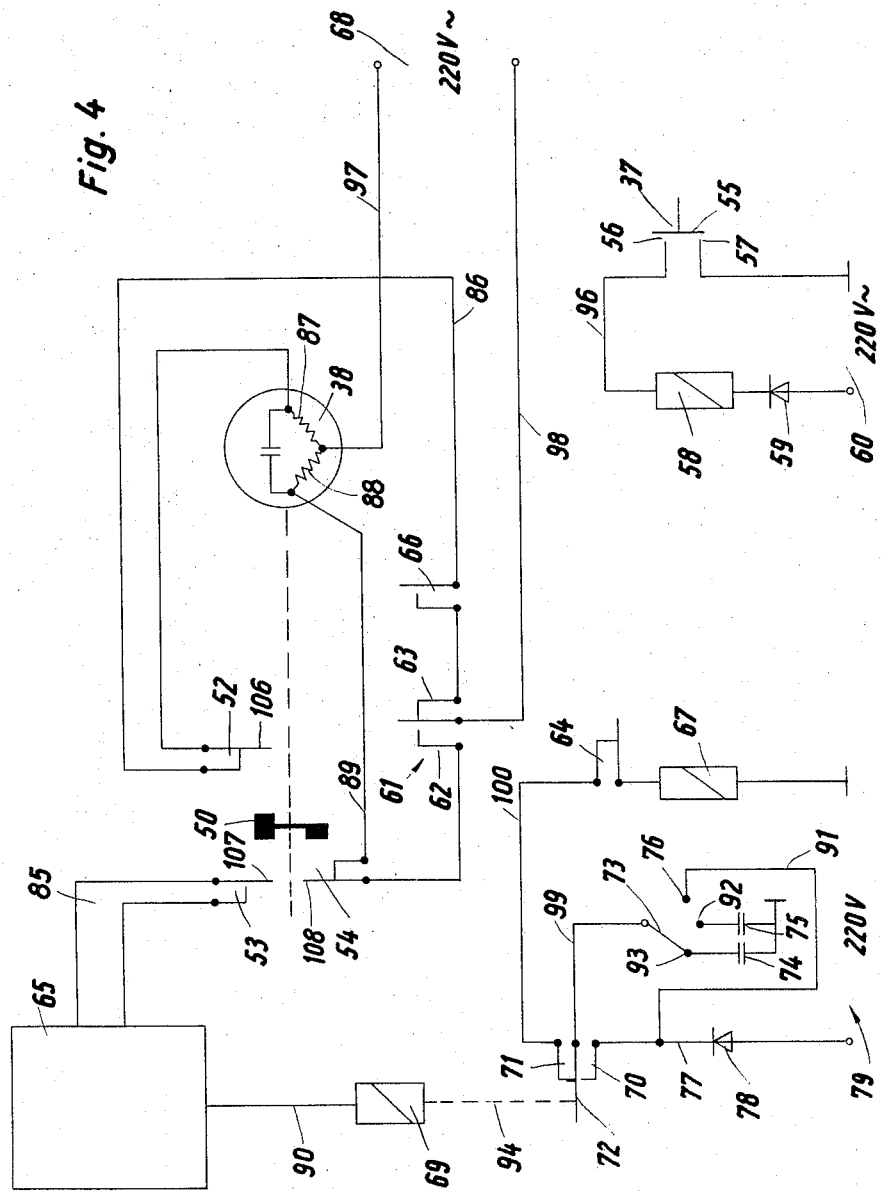
FIG. 4 is a circuit diagram explaining the roller drive.

The drive for the roller is shown in FIGS. 3 and 4. A switch panel 36 is mounted on the front of the pattern table, having several adjusting levers for different functions, as well as a push-button 37 for the simultaneous release of the roller operation and the camera release.

The table also houses a reversible electric motor 38 driving a shaft 40 through a gearing 39. This shaft 40 carries pulleys 41, 42 to each of which is attached an end of the cable controls 43, 44. These cable controls pass over reversing rollers 45, 46 to further reversing rollers 47 located at the two upper rearward corners of the table. As shown in FIG. 3, the reversing rollers 45, 46 are mounted on spindles or shafts 105 on the rear wall 83 of the table in a plane parallel to the pulleys 41, 42. The reversing rollers 45, 46 are arranged near the side walls of the table, below the reversing rollers 47. The reversing rollers 47 are not shown in FIG. 1, being located behind the ends 29, 30 of the tube and are at these ends 29, 30 substantially at the level of the circumferential grooves 31, 32.

The reversing rollers 47 are rotatably mounted in a set of supports arranged on the rear edge of the upper surface. The reversing rollers 47 are rotatable at such a level that the connected cable control 48 enters into the circumferential groove 31 substantially parallel to the upper surface 14 of the table. Naturally, during the unwinding of the cable controls from the pulleys 41, 42, the roller 27 rolls along the gradient of the table and the connected cable controls are wound on the circumferential grooves 31, 32. If the pulleys 41, 42 are actuated in the opposite sense, causing the cable controls to be wound up on these pulleys, the roller 27 revolves in a clockwise direction (FIG. 3) upwardly causing the foil to be reeled up. It may also be seen that the pulleys 41, 42 have a diameter which is much larger than that of the circumferential grooves 31, 32.

One part of the shaft 40 forms a spindle 49; a nut 50 is axially movable on this spindle but is held captive against rotation by a lever 51. This lever 51 is mounted on the rear wall 83 or on the gearing 39 and extends parallel to the spindle 49. The nut 50 has an axial recess through which passes the said lever 51. The nut collaborates with limit switches 52, 53, 54 which automatically de-energize the roller drive when the roller is in the topmost or in the bottommost position.

FIG. 3 shows the limit switches 52, 53 with their housing. These limit switches have actuating arms 106, 107 and 108, shown also in FIG. 4 which are in the path of movement of the stop formed by the captive nut 50.

For the sake of clarity it should be pointed out that the term rest contact indicates here a switch contact normally closed in the de-energized position, while a working contact is open in this position.

As may be seen from the circuit diagram 96 in FIG. 4, the push button 37 may be depressed against the force of a spring, not shown, so that its contact bridge 55 is pressed against the contact members 56, 57 in order to energize the relay 58, supplied, for example, through a rectifier 59 from a mains supply 60. This relay 58 comprises a reversing contact 61 with a working contact 62 and a rest contact 63, as well as a further rest contact 64. The diagram also shows the motor 38, the stop formed by the captive nut 50 and the limit switches 52, 53, 54 according to FIG. 3, the limit switches 53, 54 being so arranged as to be actuable simultaneously by the switching cam formed by the nut 50. The limit switches 52, 54 are rest switches which are opened in the energized position, while the limit switch 53 is a working switch which is closed on energization. The limit switch 53 serves for energizing the exposure control 65, and conductors 85 are arranged between the latter and the limit switch 53. The limit switch 52 is located in a lead 86 of the motor 38 via a rest contact 63 of the reversing switch 61 and an intermediate working switch 66, formed by a working contact of a relay 67.

The motor 38 may be energized through two windings 87, 88 from the mains connection 68, namely either through a winding 87 the limit switch 52, the working contact 66 and the rest contact 63, or through the other winding 88, the limit switch 54 and the working contact 62 of the reversing switch 61, resulting in different senses of rotation. The conductor leading to the winding 88 is shown at 89. A lead 97 leads from the mains connection directly to the motor and a lead 98 to the reversing switch 61.

The exposure control 65 is connected with a relay 69 by means of leads 90. This relay is energized as a function of an energization of the exposure control 65 by the limit switch 53 and operates a switching member 72 of a switch, having a working contact 70 and a rest contact 71. The mechanical links between the relay 69 and the switch 72 are shown at 94. A lead 99 connects the switch 72 with a size switch 73 through which capacitors 74, 75 with different values can be connected at choice through a contact 76, connected by leads 91 with the feed 77 to the working contact 70. This feed 77 contains a rectifier 78 in front of the energy source 79. The size switch 77 is connectable by hand through contacts 76, 92, 93 with one of the capacitors or with the feed 77. The relay 67 is connected with the rest contact 71 in the lead 100 through the rest contacts 64.

If the push button 37 is operated, the relay 58 is energized and the working contact 62 is actuated. The motor circuit 89 is closed by the limit switch 54 and the motor 38 revolves, under energization of the winding 88, in one direction in which the foil is placed over a pattern. When the switching cam formed by the nut 50 reaches the limit switch 54, the motor circuit is opened and the motor stops. At the same time, the limit switch 53 is closed and the exposure control 65 is actuated. This causes the relay 69 to be energized and the working contact 70 to be operated causing one of the capacitors 74, 75 to be charged in accordance with the position of the size switch 73. In the example shown in the drawing, the capacitor 74 is charged.

After the termination of the exposure time, the relay 69 is de-energized through the exposure control 65 having a member operating as a function of time, such as a clock; this causes the rest contact 71 to close and the capacitor 74 is discharged through the relay 67. The contact 66 closes. Since the push-button 37 has meanwhile been released and the relay 58 has been de-energized, the previously open rest contact 64 is again closed. The motor is thereby energized through its winding 87 through the rest contact 63, the working contact 66 and the limit switch 52 until the latter is opened by the switching cam formed by the nut 50. In consequence, the motor revolves in the opposite direction, the foil is reeled up and releases the pattern. The duration of the whole process depends on the dimensions of the capacitor 74 so that this value determines also the re-reeling travel of the foil.

When the capacitor 74 has given up its charge, the relay 67 is de-energized and the working contact 66 opens, causing the motor to stop. If the arrangement is controlled with a view to the maximum pattern size, the stopping of the motor may be controlled by the limit switch 52. It may be seen that the size switch 73 can control the amount of overrun of the foil in steps in accordance with the setting. According to the dimensioning of the capacitors 74, 75, the foil roller may be retracted through, say, one third or two thirds of its entire travel. The limit switch 52 becomes effective especially if the size switch 73 is connected with the contact 76, because in this case the energization of the relay 67 is derived directly from the voltage source 79, corresponding to the processing of the maximum size for which the arrangement is designed.

Figure 5:
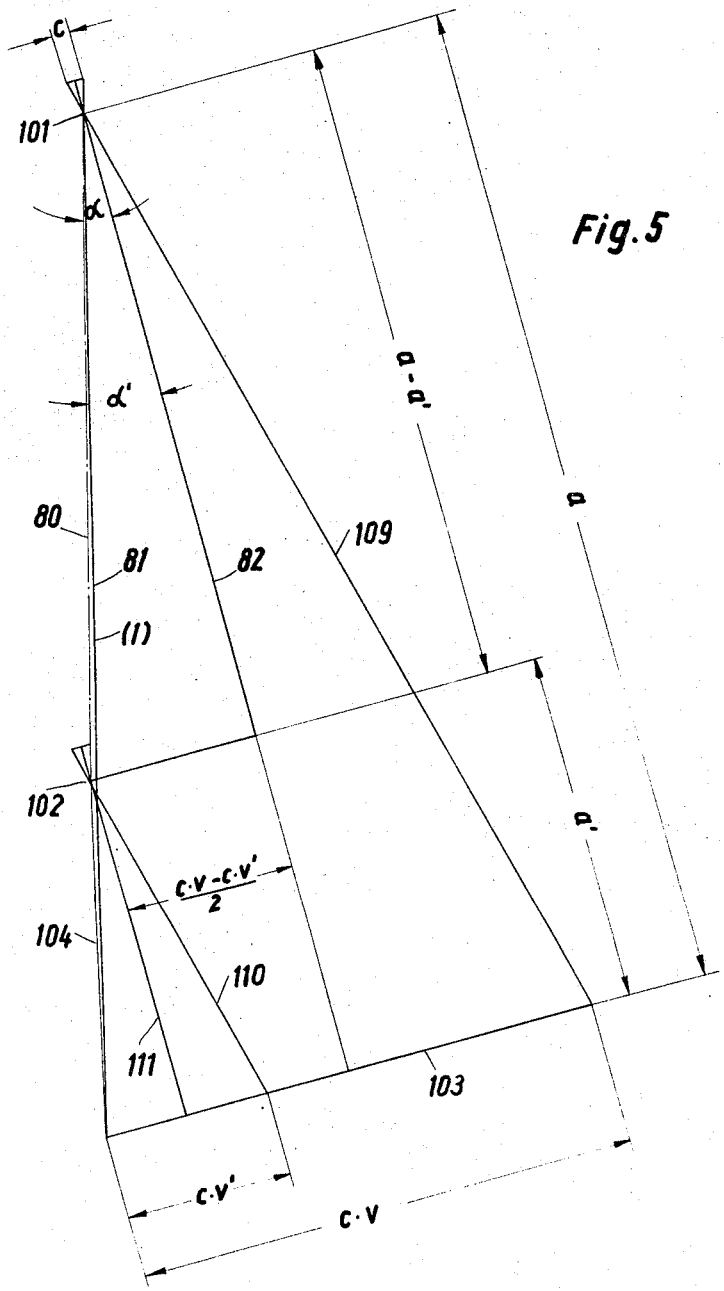
FIG. 5 shows the path of the light beams, explaining the principle of the invention.

FIG. 5 shows the relations determining a particularly convenient angle of inclination for the camera and for the pattern table under the assumption that the front edge lay of the pattern is to be combined with a vertical camera guide.

In this figure, the topmost camera position is shown at 101 and the lowest position at 102. The flanks of the picture beam extending to the front edge 103 of the lay plate (FIG. 5) are shown at 81 for the topmost camera position 101 and at 104 for the lowest camera position 102. The center vertical 82 of the picture arrangement for the topmost position 101 corresponds to the vertical 111 of the picture arrangement with lowest camera position 102.

In principle, it may be stated that the invention specifies an angle of inclination relative to the horizontal of 15° as a particularly preferred solution. By way of derivation, and using the notation shown partly in FIG. 5, the formula for calculating the object width is as follows:

$$a = (1+v)f$$

in which $v$ is the reduction and $f$ is the focal length of the objective.

In addition thereto, FIG. 5 shows the dimension $c$ for the width of the film picture which, after multiplication by the reduction, determines the size of the pattern.

$a-a'$ is the path of the whole movement of the objective in the direction perpendicular to the pattern surface; $cv-cv'$ is the horizontal displacement of the objective relative to the pattern surface in order to obtain the front edge lay.

It follows therefrom that $$tg\alpha = \frac{\frac{cv-cv'}{2}}{a-a'}$$

The above-mentioned value for the inclination results from a reduction factor of 30 and a focal length of 60 mm., wherein $c=32$ mm., $v=30$ and $v'=10$. It is to be noted that the tangent of the angle of inclination becomes the smaller the larger is the displacement. On the other hand, the tangent of the angle of inclination becomes the larger, the greater is the product $c \times v$, or the smaller is the product $c \times v'$. The dimension $c$ for the width of the film picture is therefore relevant for the tangent of the angle of inclination which will be the larger, the larger is the width of the film picture.

Apart from that, it may be stated with reference to the embodiment shown that the flank angle $\alpha'$ related to the center vertical 82 of the picture arrangement does not agree with the angle $\alpha$ between the center vertical of the picture and the displacement travel of the camera, indicated by the dash-dot straight line 80. The leg of the flank angle is shown at 81 and the center vertical at 82. The dash-dot line 80 is shown only between the two extreme camera positions. Basing the calculation on the example mentioned above, the angle $\alpha'$, is, for example 14.5°.

Although the embodiment with a vertical guide for the camera is generally to be preferred, it is obvious that the slope of the table for the foil roller guide may be combined with a certain obliqueness of the camera guide which still permits the utilization of the advantages of the foil roller control.

I claim:

1. An arrangement for a microfilm camera, comprising, in combination, a desk-shaped pattern lay table, a lay plate having a front edge and a rear edge defined on said pattern lay table having an upper surface, an elongated camera column adjacent one edge of the table and extending thereabove, guided means mounted on said camera column above said lay table for longitudinal displacement thereon, camera supporting means mounted on said guided means, a camera mounted on said supporting means, said lay table and plate surface being inclined relative to the horizontal wherein said plate front edge is disposed lower than said rear edge, said camera being supported at the same angle of inclination as said lay plate surface in said supporting means.

2. An arrangement as claimed in claim 1, wherein said camera column is disposed substantially vertical and said guided means extend substantially perpendicularly to said camera column.

3. An arrangment as claimed in claim 1, wherein said camera column is located adjacent said lay plate rear edge.

4. An arrangement as claimed in claim 2 wherein the inclination of the lay plate and of said camera is such that one flank of the picture angle of the camera is aligned with the lower front edge of the lay plate surface, said front edge forming the front lay edge for a pattern.

5. An arrangement as claimed in claim 1, wherein said lay plate is fitted into an opening defined in the upper side of said desk-shaped lay table, slot-shaped orifices defined in said table at the edges of said plate communicating with the interior of said pattern lay table, evacuation means communicating with said desk-shaped pattern lay table adapted to produce a vacuum in the interior of said table, a transparent contact foil adapted to be fitted over the surface of said plate and so dimensioned that it also extends over said slot-shaped orifices, said contact foil being in the form of a roller and capable of rolling automatically down the slope of said table so that it covers the lay plate and an original located thereon, and driving means adapted to selectively move said foil roller towards said plate upper edge in order to at least partially expose said lay plate and selectively release said roller on reversal of the direction of movement of said driving means in order to cover the lay plate and the original mounted thereon.

6. An arrangement as claimed in claim 5, wherein the roller has a spindle on which the foil is wound, an edge of the said foil being fixed to the rearward, upper edge of the lay table, and the ends of said spindle protruding laterally from the roller of foil being connected with the driving means.

7. An arrangement as claimed in claim 6, comprising a first grooved arrangement at one end of said spindle and a second grooved arrangement at the other end of said spindle, said driving means comprising a reversible driving motor mounted on said pattern lay table, first and second pulleys located on the said pattern lay table and drivingly connected for rotation in either direction with said driving motor, a first group and a second group of reversing rollers freely rotatably supported on said pattern lay table, a first cable control extending from the first of the said pulleys over the first group of reversing rollers to said first grooved arrangement and a second cable control extending over the second group of reversing rollers to the said second grooved arrangement adapted to control the position of said spindle and roller upon said lay plate.

8. An arrangement as claimed in claim 7, wherein the said driving motor is associated with control and switching means, said switching means including stop switches located within the said driving means and adapted to sense the end positions of said roller, said switching means also comprising a size switch with several differently dimensioned timing members actuable through the size switch in a control circuit of the motor during the reeling of the foil roller so as to control the running time of the motor according to the dimensioning of the energized timing member, causing the roller to expose only a defined portion of the lay surface.

9. An arrangement as claimed in claim 8, wherein said size switch includes a connecting contact and connecting means are provided between this contact and the voltage source, wherein the switching of the contact causes the energization of said motor.

10. An arrangement as claimed in claim 6, comprising an exposure control defined on the lay table, exposure means defined on the said lay table and connected with said camera, and connecting means between the control and switching means for the driving motor and the exposure control to actuate the reversing of the driving motor for the foil roller according to the operation of the exposure control.

11. An arrangement as claimed in claim 8, wherein the control and switching means are coupled with two driving means for the camera for the vertical movement of the supporting means on the guide means, and comprising a connection with the size switch in order to actuate the reverse travel of the foil roller in accordance with the reproduction width.

12. An arrangement as claimed in claim 1, wherein the angle of inclination of the lay table relative to the horizontal is determined by the relation $$tg\alpha = \frac{\frac{cv-cv'}{2}}{a-a'}$$

wherein $c$ is the dimension of the width of the camera film strip, $v$ is the reduction and $a$ is the object width and the values with the prime (') indicate the dimensions for the minimum object width.

13. An arrangement as claimed in claim 1, in which the inclination of the pattern lay table to the horizontal is about 15°.

14. An arrangement as claimed in claim 4, where the said one flank of the picture angle of the camera aligned with the lower front edge of the lay plate's surface is substantially parallel to said camera column wherein adjustment of said guided means upon said column does not substantially vary the alignment of said one flank of the picture angle relative to said lower front edge of the lay plate surface.

References Cited by the Examiner

UNITED STATES PATENTS 2,474,055  6/1949  Lacey _____ 88—24

NORTON ANSHER, *Primary Examiner.*

R. A. WINTERCORN, *Assistant Examiner.*